(12) United States Patent
Verger et al.

(10) Patent No.: US 9,107,159 B2
(45) Date of Patent: Aug. 11, 2015

(54) ENHANCING JITTER BUFFER PERFORMANCE THROUGH RADIO LEVEL FEEDBACK

(71) Applicant: Apple Inc., Cupertino, CA (US)

(72) Inventors: Luciano M Verger, Santa Clara, CA (US); Madhusudan Chaudhary, Campbell, CA (US); Onur E Tackin, Sunnyvale, AZ (US); Oren M Elrad, San Francisco, CA (US); Srinivasan Vasudevan, Sunnyvale, CA (US); Thanigaivelu Elangovan, Santa Clara, CA (US); Tiange Shao, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 14/293,494

(22) Filed: Jun. 2, 2014

(65) Prior Publication Data

US 2014/0362830 A1    Dec. 11, 2014

Related U.S. Application Data

(60) Provisional application No. 61/832,441, filed on Jun. 7, 2013.

(51) Int. Cl.
*H04L 1/00* (2006.01)
*H04W 56/00* (2009.01)
(Continued)

(52) U.S. Cl.
CPC ........... *H04W 56/003* (2013.01); *H04J 3/0632* (2013.01); *H04L 29/06027* (2013.01); *H04W 36/0072* (2013.01); *H04W 36/14* (2013.01); *H04L 1/203* (2013.01); *H04W 36/0022* (2013.01)

(58) Field of Classification Search
CPC .......... H04W 56/003; H04W 36/0072; H04W 36/14; H04W 36/0022; H04J 3/0632; H04L 29/06027; H04L 1/203
See application file for complete search history.

(56) References Cited

U.S. PATENT DOCUMENTS 7,970,020 B2   6/2011   Hannu et al.
8,085,678 B2   12/2011  Spindola et al.
(Continued)

FOREIGN PATENT DOCUMENTS

WO   2006044696   4/2006

OTHER PUBLICATIONS

International Search Report and Written Opinion from PCT/US2014/040901, issued Sep. 24, 2014, Apple Inc., pp. 1-5.
(Continued)

*Primary Examiner* — Clemence Han
(74) *Attorney, Agent, or Firm* — Meyertons, Hood, Kivlin, Kowert & Goetzel, P.C.; Jeffrey C. Hood (57) ABSTRACT

A jitter buffer in a Voice over LTE receiver may be influenced by radio level feedback (RLF) from both local and remote endpoints to preemptively adjust the jitter buffer delay in anticipation of predicted future losses that have a high probability of occurring. The radio events of the RLF and the scenarios that trigger the preemptive adjustments may be identified, and their use may be expressed in terms of mathematical formulas. In prior art designs, the instantaneous jitter is derived from a weighted history of the media stream, and consequently only packets that have already arrived are used to compute the instantaneous jitter to adjust the length of the buffer. By providing and using RLF from both local and remote endpoints, the anticipated delay—for packets that have not yet arrived—may be used to preemptively adjust the buffer, thereby minimizing packet loss without introducing unnecessary delay.

20 Claims, 4 Drawing Sheets

(51) Int. Cl.
*H04W 36/00* (2009.01)
*H04J 3/06* (2006.01)
*H04L 29/06* (2006.01)
*H04W 36/14* (2009.01)
*H04L 1/20* (2006.01)

(56) References Cited

U.S. PATENT DOCUMENTS

| | | |
|---|---|---|
| 8,391,320 B2 | 3/2013 | Lubbs et al. |
| 8,885,609 B2 | 11/2014 | Nix |
| 2006/0045139 A1 | 3/2006 | Black et al. |
| 2007/0076754 A1* | 4/2007 | Krishnaswamy .............. 370/468 |
| 2011/0007693 A1 | 1/2011 | Frusina et al. |
| 2011/0257983 A1 | 10/2011 | Rathonyi et al. |
| 2012/0106338 A1* | 5/2012 | Pongracz et al. ............. 370/235 |
| 2014/0056159 A1* | 2/2014 | Hedlund et al. .............. 370/252 |
| 2014/0169192 A1* | 6/2014 | Zhang et al. .................. 370/252 |

OTHER PUBLICATIONS

"Qos Analysis of Video Streaming Service in Live Cellular Networks", Almudena Diaz, et al., Aug. 3, 2008, pp. 1-14.
"Performance Evaluation of a Voice Call Handover Scheme Between LTE and UMTS", J. Namakoye, R. Van Olst, Sep. 2011, pp. 1-6.

* cited by examiner

ENHANCING JITTER BUFFER PERFORMANCE THROUGH RADIO LEVEL FEEDBACK

PRIORITY CLAIM

This application claims benefit of priority of U.S. Provisional Patent Application Ser. No. 61/832,441 titled "Enhancing Jitter Buffer Performance Through Radio Level Feedback", filed on Jun. 7, 2013, which is hereby incorporated by reference as though fully and completely set forth herein.

FIELD OF THE INVENTION

The present application relates to wireless communication devices, and more particularly to reducing packet loss and packet delay in voice over Long Term Evolution (VoLTE) communications.

DESCRIPTION OF THE RELATED ART

Wireless communication systems are rapidly growing in usage. In recent years, wireless devices such as smart phones and tablet computers have become increasingly sophisticated. In addition to supporting telephone calls, many mobile devices now provide access to the internet, email, text messaging, and navigation using the global positioning system (GPS), and are capable of operating sophisticated applications that utilize these functionalities. In general, wireless communication technologies, such as cellular communication technologies, are substantially designed to provide mobile communication capabilities to wireless devices generally powered by a portable power supply, e.g., a battery.

One of the latest wireless communications standards is LTE (Long Term Evolution), which provides a standard for wireless communication of high-speed data for mobile phones and data terminals. It is based on the GSM/EDGE (Global System for Mobile Communications/Enhanced Data rates for GSM) and UMTS/HSPA (Universal Mobile Telecommunications System/High Speed Packet Access) network technologies, and increases the capacity and speed using a different radio interface together with core network improvements. Overall, LTE is considered an evolution of the GSM/UMTS standards leading to a new standard for wireless data communications technology. The goals of LTE were to increase the capacity and speed of wireless data networks using new DSP (Digital Signal Processing) techniques, and simplify the network architecture to an IP-based system with significantly reduced transfer latency compared to the older architecture(s). As a result, the LTE wireless interface is incompatible with 2G and 3G networks, and must therefore be operated on a separate wireless spectrum.

Since LTE standard only supports packet switching with its all-IP network, and voice calls in GSM, UMTS and CDMA2000 (Code Division Multiple Access 2000) are circuit switched, the adoption of LTE necessitated the re-engineering of voice call networks for use with the LTE standard. This re-engineering effort yielded three different approaches, one of which is called VoLTE (Voice Over LTE). The VoLTE approach is based on the IPMS (Internet Protocol Multimedia Subsystem) network, with specific profiles for control and media planes of voice service on LTE defined by GSMA in PRD IR.92 (Product Requirements Document IR.92). In VoLTE, the voice service (control and media planes) are delivered as data flows within the LTE data bearer, which means that the legacy Circuit Switch voice network no longer needs to be maintained.

In voice solutions such as VoLTE, receivers must be robust to variations in packet delivery times. This is typically accomplished through the use of a buffering mechanism in which the receiver delays playout of the incoming stream (i.e. delays playing the incoming stream) in order to accommodate any variance in the network delay, which is referred to as the jitter (i.e., jitter is the variance in the network delay). These algorithms necessarily trade off between maintaining the media stream integrity and keeping a lower buffering delay.

SUMMARY OF THE INVENTION

In one set of embodiments, a jitter buffer may be adapted to keep both packet delay and packet loss rate at a minimum, for example during VoLTE (voice over Long Term Evolution) communications, as perceptual audio quality is negatively impacted both by losses and by latency. Accordingly, an user device (operated to facilitate VoLTE communications, for example) may be influenced by providing radio level feedback (RLF) from both local and remote endpoints, and preemptively adjust the jitter buffer delay in anticipation of future predicted losses that have yet to occur, and have very high probability (large certainty) of occurring. A set of radio events may be specified to be included in the RLF, and various scenarios that provide the trigger for preemptive action by the jitter buffer may be identified. The use of the events and scenarios for preemptive action may be expressed in terms of mathematical formulas. In most prior art designs, the instantaneous jitter is derived from a weighted history of the media stream, and consequently only packets that have already arrived to the device are used to compute the instantaneous jitter, and adjust the length of the playout buffer.

In one set of embodiments, an improved wireless user equipment (UE) device may include a radio with one or more antennas for performing wireless communication that includes receiving incoming transmission packets, and may also include a jitter buffer to queue the incoming transmission packets. A processing element coupled to the radio and the jitter buffer in the UE device may operate to identify radio events that affect a timing of future transmission packets to be received in the future by the radio, calculate a projected delay associated with the radio events, and determine an effective delay according to the projected delay. The effective delay may then be used to control when the queued incoming transmission packets are released from the jitter buffer.

The identified radio event may be a handover from one base station facilitating communication between the UE device and a second UE device, to another base station that is to take over facilitating the communication between the UE and the second UE. The radio event may also be a transfer of a communication in progress between the UE device and the second UE device on a first network associated with a first transmission technology, to a second network associated with a second transmission technology. The radio events may also include signal strength measurements associated with signals carrying the incoming transmission packets received by the radio, measurements of packet error rates associated with the incoming transmission packets, and/or a count of a number of uplink retransmissions performed by the radio.

The processing element in the UE device may also operate to estimate two empirical factors for each respective radio event type of the radio events, and calculate the projected delay associated with each respective radio event type according to the two empirical factors estimated for that respective radio event type. Two empirical factors may include a first empirical factor corresponding to an expected delay caused by the respective radio event type, and a second empirical factor corresponding to a duration of the respective radio event. In calculating the projected delay, the processing element may apply a weighting function to the second empirical factor.

One method for enhancing radio communications performance through radio level feedback may include receiving incoming transmission packets via a wireless communication medium, queuing and holding the incoming transmission packets, identifying radio events that affect a timing of future transmission packets to be received in the future, calculating a projected delay associated with the radio events, and determining an effective delay according to the projected delay, wherein the effective delay is usable to control when the queued incoming transmission packets are released. The incoming transmission packets may be queued and held in a buffer, and the effective delay may be used to control when the queued incoming transmission packets held in the buffer are released from the buffer. The method may also include estimating two empirical factors for each respective radio event type of the radio events, and calculating the projected delay associated with each respective radio event type according to the two empirical factors estimated for that respective radio event type. A first empirical factor may correspond to an expected delay caused by the respective radio event type while a second empirical factor may correspond to a duration of the respective radio event, and calculating the projected delay may include applying a weighting function to the second empirical factor.

According to various embodiments, an improved wireless communication network may include mobile devices that wirelessly communicate with each other. A least a first mobile device of the mobile devices may receive incoming transmission packets through wireless communication, queue and hold the incoming transmission packets, identify radio events that affect a timing of future transmission packets to be received in the future by the first mobile device, calculate a projected delay associated with the radio events, and determine an effective delay according to the projected delay. The effective delay is then used to control when the queued incoming transmission packets are released. The radio events may be local radio events associated with the first mobile device and/or remote radio events associated with at least a second mobile device of the mobile devices.

In some embodiments the wireless communication network further includes a first base station and a second base station, both base stations capable of facilitating communication between the mobile devices. The radio events may then include a handover from the first base station, which is presently facilitating communication between the mobile devices, to the second base station, which is to take over facilitating the communication between the mobile devices. In some embodiments the wireless communication network is associated with a first transmission technology, and the radio events may include transfer of a communication in progress between the mobile devices on the wireless network to a second network associated with a second transmission technology. Furthermore, each mobile device may be operated to identify radio events that affect a timing of future transmission packets to be received in the future by the mobile device, to adapt to upcoming communications disruptions. Accordingly, the first mobile device may send signaling corresponding to the radio events to a second mobile device, allowing the second mobile device to calculate a second projected delay associated with the radio events and relating to the second mobile device, and determine a second effective delay according to the second projected delay, whereby the second effective delay is usable by the second mobile device to control when transmission packets received and queued by the second mobile device are released.

Thus, in an improved system, RLF may be provided from both the local and remote end such that the anticipated delay—for packets that have not yet arrived—is used to pre-emptively adjust the buffer to minimize packet loss without introducing unnecessary delay.

While features described herein are susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION OF THE EMBODIMENTS

Acronyms

The following acronyms may appear in the present Provisional Patent Application:

BLER: Block Error Rate (same as Packet Error Rate)
BER: Bit Error Rate
BS: Base Station
CDMA: Code Division Multiple Access
C-DRX: Connected Discontinuous Reception
CRC: Cyclic Redundancy Check
DL: Downlink
DRX: Discontinuous Reception
EDGE: Enhanced Data rates for GSM Evolution
GSM: Global System for Mobile Communication
GSMA: GSM Association
HSPA: High Speed Packet Access
HO: Handover
LTE: Long Term Evolution
PDCCH: Physical Downlink Control Channel
PDSCH: Physical Downlink Shared Channel
PER: Packet Error Rate
PRD: Product Requirements Document
PUCCH: Physical Uplink Control Channel
PUSCH: Physical Uplink Shared Channel
SFN: System Frame Number
SINR: Signal to Interference-and-Noise Ratio
SIR: Signal to Interference Ratio
SNR: Signal to Noise Ratio
SPS: Semi Persistent Scheduling
Tx: Transmission
UE: User Equipment
UL: Uplink
UMTS: Universal Mobile Telecommunication System
VoLTE: Voice over LTE Terms The following is a glossary of terms that may appear in the present application:

Memory Medium—Any of various types of memory devices or storage devices. The term "memory medium" is intended to include an installation medium, e.g., a CD-ROM, floppy disks 104, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may comprise other types of memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer system for execution. The term "memory medium" may include two or more memory mediums which may reside in different locations, e.g., in different computer systems that are connected over a network.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System (or Computer)—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems devices which are mobile or portable and which performs wireless communications. Examples of UE devices include mobile telephones or smart phones (e.g., iPhone™, Android™-based phones), portable gaming devices (e.g., Nintendo DS™, PlayStation Portable™, Gameboy Advance™, iPhone™), laptops, PDAs, portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication.

Base Station (BS)—The term "Base Station" has the full breadth of its ordinary meaning, and at least includes a wireless communication station installed at a fixed location and used to communicate as part of a wireless telephone system or radio system.

Talkspurt—A talkspurt is a continuous segment of speech transmitted between silent intervals, that is, between intervals where only background noise can be heard. By segmenting speech streams into talkspurts, bandwidth may be conserved since excess data is not transmitted during silent intervals. Intervals between talkspurts may be used for the purposes of synchronization, and for readjusting buffering and other parameters of the communications system. In GSM and packetized speech systems such as voice over IP, talkspurt and silence are distinguished from each other.

Processing Element—refers to various elements or combinations of elements. Processing elements include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Figure 1:
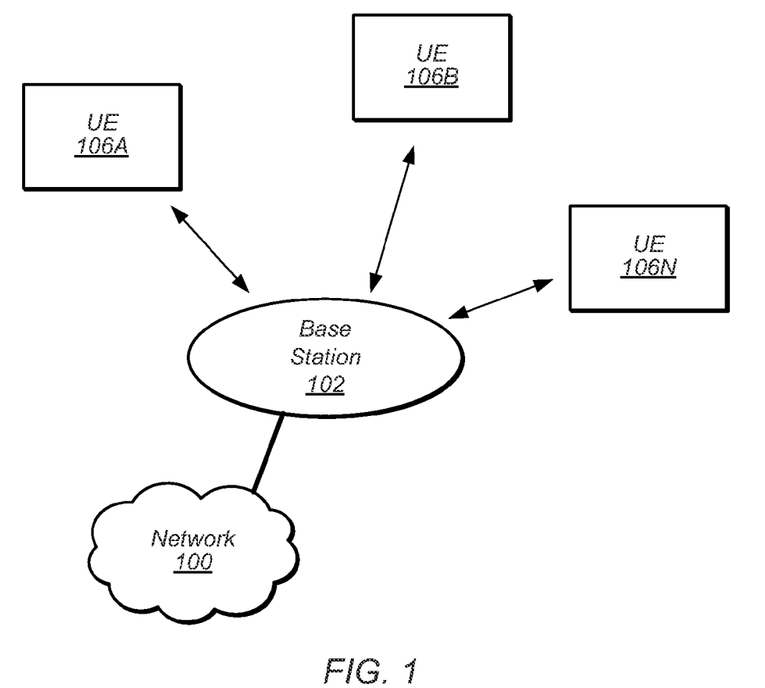
FIG. 1 illustrates an exemplary (and simplified) wireless communication system.
Figure 2:
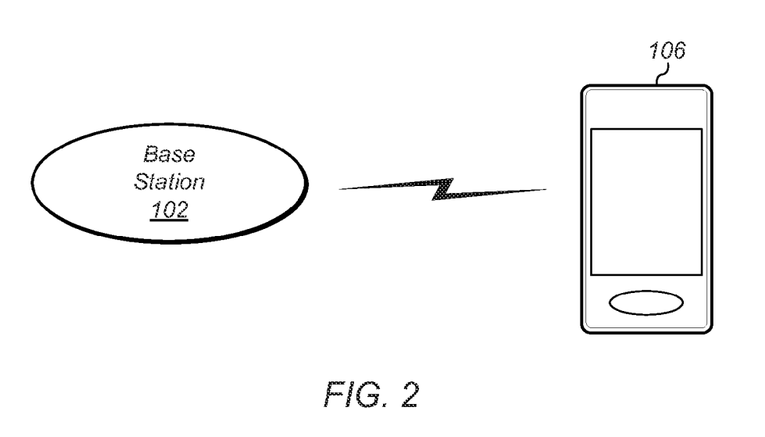
FIG. 2 illustrates a base station in communication with a wireless user equipment (UE) device.

FIGS. 1 and 2—Communication System

FIG. 1 illustrates an exemplary (and simplified) wireless communication system. It is noted that the system of FIG. 1 is merely one example of a possible system, and embodiments may be implemented in any of various systems, as desired.

As shown, the exemplary wireless communication system includes a base station 102 which communicates over a transmission medium with one or more user devices 106-1 through 106-N. Each of the user devices may be referred to herein as a "user equipment" (UE). Thus, the user devices 106 are referred to as UEs or UE devices.

The base station 102 may be a base transceiver station (BTS) or cell site, and may include hardware that enables wireless communication with the UEs 106A through 106N. The base station 102 may also be equipped to communicate with a network 100 (e.g., a core network of a cellular service provider, a telecommunication network such as a public switched telephone network (PSTN), and/or the Internet, among various possibilities). Thus, the base station 102 may facilitate communication between the user devices and/or between the user devices and the network 100. The communication area (or coverage area) of the base station may be referred to as a "cell." A "serving cell" may therefore refer to the communication area of a base station currently handling communications between devices.

The base station 102 and the user devices may communicate over the transmission medium using any of various radio access technologies (RATs), also referred to as wireless communication technologies, or telecommunication standards, such as GSM, UMTS (WCDMA), LTE, LTE-Advanced (LTE-A), 3GPP2 CDMA2000 (e.g., 1xRTT, 1xEV-DO, HRPD, eHRPD), Wi-Fi, WiMAX etc.

UE 106 may be capable of communicating using multiple wireless communication standards. For example, a UE 106 may communicate using either or both of a 3GPP cellular communication standard (such as LTE) or a 3GPP2 cellular communication standard (such as a cellular communication standard in the CDMA2000 family of cellular communication standards). Thus in some embodiments, the UE 106 may communicate with base station 102 according to a first cellular communication standard (e.g., LTE) and may also communicate with other base stations according to a second cellular communication standard (e.g., one or more CDMA2000 cellular communication standards). Base station 102 and other similar base stations operating according to the same or a different cellular communication standard may thus be provided as one or more networks of cells, which may provide continuous or nearly continuous overlapping service to UE 106 and similar devices over a wide geographic area via one or more cellular communication standards.

The UE 106 may also or alternatively communicate using WLAN, Bluetooth, one or more global navigational satellite systems (GNSS, e.g., GPS or GLONASS), one and/or more mobile television broadcasting standards (e.g., ATSC-M/H or DVB-H), etc. Other combinations of wireless communication standards (including more than two wireless communication standards) are also possible.

FIG. 2 illustrates user equipment 106 (e.g., one of the devices 106-1 through 106-N) in communication with the base station 102. The UE 106 may be a device with wireless network connectivity such as a mobile phone, a hand-held device, a computer or a tablet, or virtually any type of wireless device. The UE 106 may include a processor to execute program instructions stored in memory. The UE 106 may perform any of the method embodiments described herein by executing such stored instructions. Alternatively, or in addition, the UE 106 may include a programmable hardware element such as an FPGA (field-programmable gate array) to perform any of the method embodiments described herein, or any portion of any of the method embodiments described herein. The UE 106 may also communicate using any of multiple wireless communication protocols. For example, the UE 106 may communicate using two or more of CDMA2000, LTE, LTE-A, WLAN, or GNSS. Other combinations of wireless communication standards are also possible.

The UE 106 may include one or more antennas for communicating using one or more wireless communication protocols. In some embodiments, the UE 106 may share one or more parts of a receive and/or transmit chain between multiple wireless communication standards. The shared radio may include a single antenna, or may include multiple antennas (e.g., for MIMO) for performing wireless communications. Alternatively, the UE 106 may include separate transmit and/or receive chains (e.g., including separate antennas and other radio components) for each wireless communication protocol with which UE 106 communicates. As another alternative, the UE 106 may include one or more radios which are shared between multiple wireless communication protocols, and one or more radios which are used exclusively by a single wireless communication protocol. For example, the UE 106 may include a shared radio for communicating using either of LTE or CDMA2000 1xRTT, and separate radios for communicating using each of Wi-Fi and Bluetooth. Other configurations are also possible.

Figure 3:
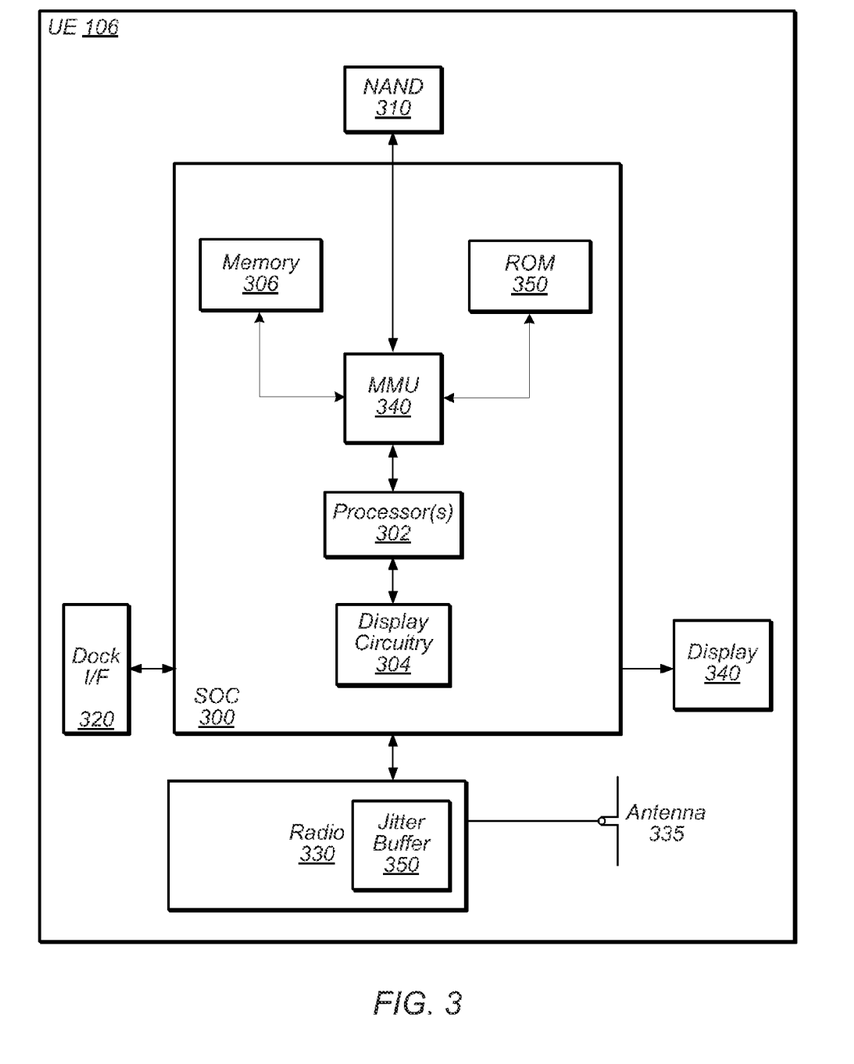
FIG. 3 illustrates an exemplary block diagram of a UE device, according to one embodiment.

FIG. 3—Exemplary Block Diagram of a UE

FIG. 3 illustrates an exemplary block diagram of a UE 106. As shown, the UE 106 may include a system on chip (SOC) 300, which may include portions for various purposes. For example, as shown, the SOC 300 may include processor(s) 302 that may execute program instructions for the UE 106 and display circuitry 304 which may perform graphics processing and provide display signals to the display 340. The processor(s) 302 may also be coupled to memory management unit (MMU) 340, which may receive addresses from the processor(s) 302 and translate those addresses to locations in memory (e.g., memory 306, read only memory (ROM) 350, NAND flash memory 310) and/or to other circuits or devices, such as the display circuitry 304, radio 330, connector I/F 320, and/or display 340. The MMU 340 may perform memory protection and page table translation or set up. In some embodiments, the MMU 340 may be included as a portion of the processor(s) 302.

As shown, the SOC 300 may be coupled to various other circuits of the UE 106. For example, the UE 106 may include various types of memory (e.g., including NAND flash 310), a connector interface 320 (e.g., for coupling to the computer system), the display 340, and wireless communication circuitry (e.g., for LTE, LTE-A, CDMA2000, Bluetooth, Wi-Fi, GPS, etc.). The UE device 106 may include at least one antenna, and possibly multiple antennas, for performing wireless communication with base stations and/or other devices. For example, the UE device 106 may use antenna 335 to perform the wireless communication. As noted above, the UE may communicate wirelessly using multiple wireless communication standards in some embodiments.

As will be further described in more detail herein, the UE 106 may include hardware and software components for implementing a jitter buffer for supporting VoLTE communications during which the UE 106 remains robust to variations in packet delivery times. In some embodiments, jitter buffer functionality and implementation (which will also be further described in more detail below) may be included in Radio circuitry 330. In other embodiments, the jitter buffer implementation may be distributed over multiple components within UE 106. For example, processor 302, Radio circuitry 330, memory 306, ROM 350, and/or MMU 340 may execute all or portions of various tasks associated with the jitter buffer implementation. Generally, processor 302 of the UE device 106 may implement part or all of the methods described herein, e.g., by executing program instructions stored on a memory medium (e.g., a non-transitory computer-readable memory medium). In other embodiments, processor 302 may be a programmable hardware element, such as an FPGA (Field Programmable Gate Array), or as an ASIC (Application Specific Integrated Circuit).

Figure 4:
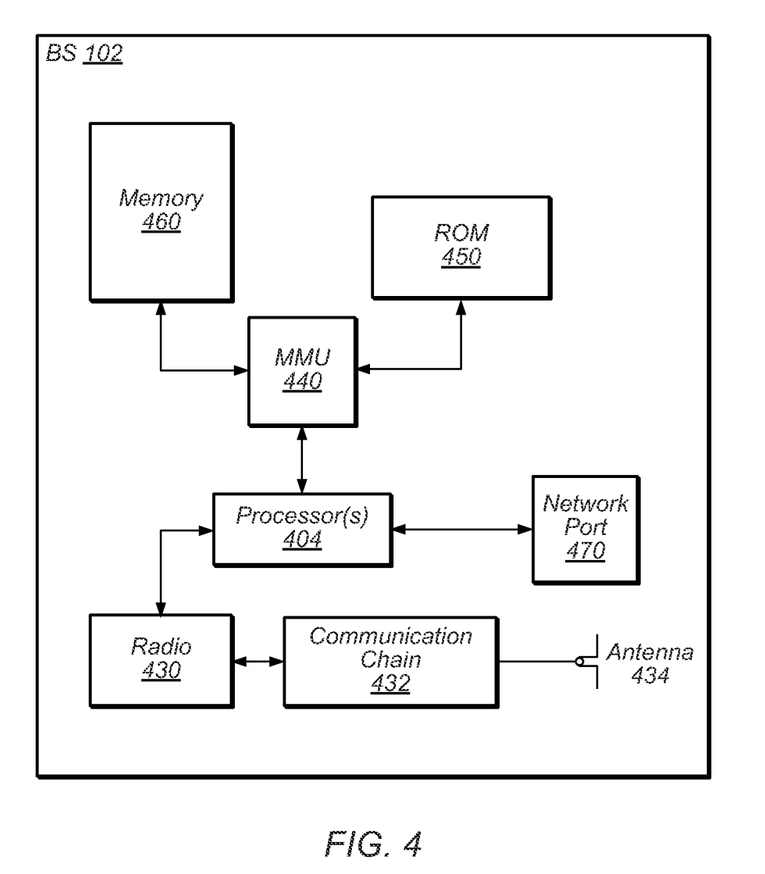
FIG. 4 illustrates an exemplary block diagram of a base station.

FIG. 4—Exemplary Block Diagram of a Base Station

FIG. 4 illustrates an exemplary block diagram of a base station 102. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may receive addresses from the processor(s) 404 and translate those addresses to locations in memory (e.g., memory 460 and read only memory (ROM) 450) or to other circuits or devices.

The base station 102 may include at least one network port 470. The network port 470 may couple to a telephone network and provide a plurality of devices, such as UE devices 106, access to the telephone network as described above in FIGS. 1 and 2. The network port 470 (or an additional network port) may also or alternatively couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

The base station 102 may include at least one antenna 434, and possibly multiple antennas. The at least one antenna 434 may operate as a wireless transceiver and may further communicate with UE devices 106 via radio 430. The antenna 434 communicates with the radio 430 via communication chain 432. Communication chain 432 may be a receive chain, a transmit chain or both. The radio 430 may communicate via various wireless telecommunication standards, including, but not limited to, LTE, LTE-A WCDMA, CDMA2000, etc.

The processor 404 of the base station 102 may implement part or all of the methods described herein, e.g., by executing program instructions stored on a memory medium (e.g., a non-transitory computer-readable memory medium). Alternatively, the processor 404 may be a programmable hardware element, such as an FPGA (Field Programmable Gate Array), or as an ASIC (Application Specific Integrated Circuit), or a combination thereof.

VoLTE

As previously mentioned, in reference to FIG. 3, UE device 106 may include a jitter buffer 350 in Radio block 330. Furthermore, when UE 106 operates as a VoLTE receiver/device, jitter buffer 350 may be influenced by radio level feedback (RLF) from both local and remote endpoints (e.g. UE devices 106A through 106N shown in FIG. 1) to preemptively adjust the jitter buffer delay in anticipation of predicted future losses that have a high probability of occurring. The local and remote radio events (LRE and RRE, respectively) that may be part of the RLF, and the scenarios that trigger the preemptive adjustments may be specified and/or determined according to various embodiments.

In one set of embodiments, various LREs may be identified and used for adjusting the playout rate of the jitter buffer. That is, the various LREs may be identified and used for adjusting the rate at which data is provided from the jitter buffer (e.g. jitter buffer 350 in FIG. 3). The protocol layer may send notifications to the jitter buffer implementation to indicate the type of event and the expected timing of the event. Again, it should be noted that as used herein, the term "jitter buffer implementation" is used to refer not only to the jitter buffer itself (such as jitter buffer 350, for example), but all the elements and/or circuitry used to operate and adjust the rate at which data is provided from the jitter buffer, as previously explained with respect to FIG. 3. The events that may be identified and used for adjusting the playout rate of the jitter buffer include:

Handovers:

Inter eNodeB (base station, also indicated herein as eNB) handovers (HO) with ×2 forwarding can introduce a voice outage of about 80-100 ms, which is typically preceded by measurement reports from UE 106 to eNodeB (e.g. BS 102). Based on measurement reports, the serving eNodeB may start handover preparation, which involves signaling between the serving eNB (which currently facilitates the communication) and the target eNB (which is taking over facilitation of the communication) and admission control of the UE at the target eNB. After the preparation is complete, the serving eNB sends a handover command to the UE, and the connection to the serving cell (i.e. the coverage area of the serving eNB) is released. This marks the start of the outage duration, following which the UE may synchronize with, and access the target eNB over the RACH (Random-Access Chanel). Once the UE resumes data transfer with the target eNB, the outage ends. The jitter buffer implementation may use the time interval—between sending a measurement report that meets handover hysteresis, and a handover command that marks the start of the outage—to prepare for this upcoming outage.

SRVCC:

Single Radio Voice Call Continuity is a solution that transfers VoLTE calls in progress with LTE network to legacy voice networks. SRVCC is therefore very important in filling the gaps in LTE network deployment. The procedure, however, may introduce an average outage of about 200 ms. Though the life cycle of the jitter buffer may end towards the end of this procedure, (prior) awareness of an upcoming SRVCC procedure may help the UE build up sufficient frames in the jitter buffer to mask the outage seen by the user.

Radio Link Failure:

(T311, N310) After receiving N310 consecutive out-of-sync indications from lower layers, a T310 timer may be started, and upon expiration of the counter, the UE may attempt a connection re-establishment procedure. Typically, SRVCC triggers prior to this event. However, for operators that do not support SRVCC, this might result in a dropped call, if another suitable cell (i.e. base station coverage area) is not found. In order to accommodate outages like this, the jitter buffer may be operated to key off of the RSRP (signal strength) measurements well in advance to increase the buffering.

UL/DL BLER—

Uplink and Downlink BLER may be used in a manner similar to, and in addition to measurement reports, to adapt the playout rate of the jitter buffer.

Number of UL Re-transmissions—

The number of UL re-transmissions may also play a key role in the jitter seen by the remote end.

In one set of embodiments, the above events may also be signaled to the remote end, which would allow the jitter buffer on the remote end to intelligently adapt to the upcoming disruption. Based on the exemplary embodiment shown in FIG. 1, for example, if UE 106A is designated as a local device, and UE 106B is designated as a remote device, then signaling may be sent from UE 106A to UE 106B to allow a jitter buffer in UE 106B to intelligently adapt to the upcoming disruption. For instance, if a local UE is about to execute an HO imminently, a remote UE may likewise increase its buffer size to compensate for the expected rise in its downlink delay. Similarly, if the local UE is experiencing a high UL (uplink) retransmission rate, the remote UE may likely encounter increased jitter in the near future. In some embodiments, the local device may signal the events to the remote device via in-band signaling, and vice versa.

As previously mentioned, the effects that the identified radio events have on packet timing may then be integrated into the jitter buffer delay calculations. Once the local and remote events that are likely to contribute to spikes in the jitter have been identified, a specified number of empirical factors may be estimated for each such event type e. In one embodiment, two empirical factors are estimated. The two empirical factors are $D_e$ and $T_e$, which correspond to the expected additional delay caused by the event and the duration of the impairment, respectively. The total additional delay that is expected from the local radio link may then be written:

$$D_{radio}(t) = \sum_e D_e W(t - t_e, T_e) \qquad (1)$$

where
$D_e$ is the delay associated with event e,
$t-t_e$ is the current time minus the time at which the event occurred,
$T_e$ is the duration of the impairment,
$W(t; T)$ is a suitable time weighting function.

One particular choice of the weighting function may be a logistic function:

$$L(t,T)=(1+\exp[6*(t/T-1)])^{-1}. \qquad (2)$$

The total optimal Jitter Buffer delay may then be computed:

$$D_{effective}=D_{radio}(t)+D_{queue} \qquad (3)$$

where $D_{queue}$ is the computed delay for all packets that have already been queued in the jitter buffer, for instance via Concord Method or Quality-based.

It should also be noted that the radio events may also facilitate intra-talk techniques when they are received during talkspurt streaming. That is, in addition to the jitter buffer being useful between talkspurts, the advanced radio events may also be beneficial to intra-talkspurt techniques, which requires either temporal extension or reduction of the signal waveform durations in order to avoid abrupt interruptions or overlaps any time during the talkspurt streaming. The radio events may provide a receiver more information to better determine the length of time interval necessary to receive the next packet, and thus establish the time warping strategy for next packet playout. In this manner, the jitter buffer may act more promptly in response to the predicted loss.

Overall, it becomes possible to determine a current total expected delay that incorporates all previous radio events, and is properly weighted by time of arrival. The weighting function may be applied to ensure that $D_{radio}(t)$ reflects the current state of the radio, and to also ensure that the effect of a particular event is not double-counted once the packet is queued in the buffer and the delay has already been added to $D_{queue}$. Accordingly, the weighting function may quickly tend to zero in the expected time between when the event occurs and when the affected packets are queued. This ensures that $D_{radio}(t)$ fulfills the role of a fast-attack-fast-decay portion of the jitter buffer algorithm, whereas $D_{queue}$ fulfills the role of slow adaptation to average link conditions.

The benefits of integrating the information described above into the jitter buffer implementation include the capacity of making the algorithm used for $D_{queue}$ more aggressive—i.e. resulting in shorter delays—without increasing the risk of compromising the media stream due to radio impairments. They also allow for preemptively inserting delay into the system to offset the upcoming radio impairment induced jitter, without waiting for the jitter buffer implementation to miss a packet, then adapt to the event after the fact. Finally, it makes it possible for the jitter buffer to not have to unnecessarily adapt to a higher latency for one-time radio condition degradation events where the degradation is only momentary.

Figure 5:
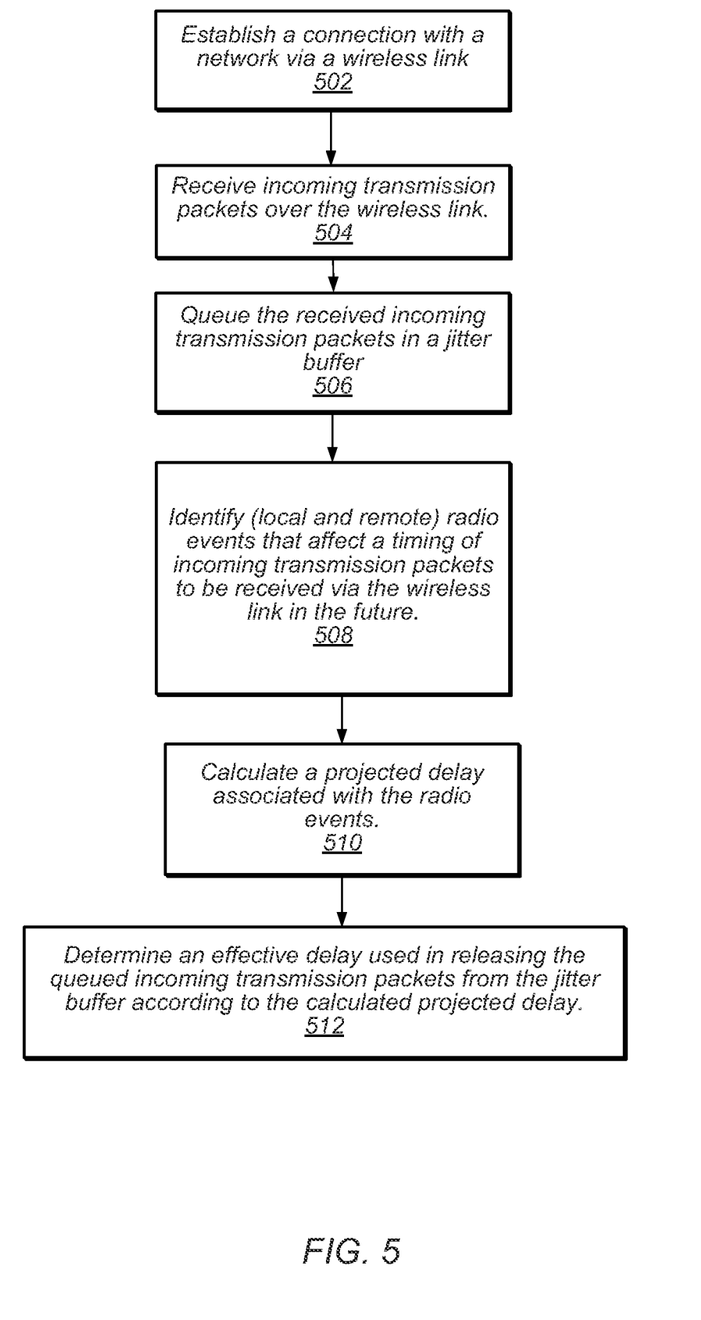
FIG. 5 shows a flow diagram of a method for improved wireless communications performance according to one embodiment.

FIG. 5 shows a flow diagram of a method for improved operation of a jitter buffer according to one embodiment. The jitter buffer may be a buffer such as jitter buffer 350 shown in FIG. 3, and the entire jitter buffer solution may be implemented in a UE device, such as the one shown in FIG. 3 and which has been previously described in more detail. As shown in FIG. 5, a connection may be established—by a mobile device, for example—with a network via a wireless link (502), and incoming transmission packets may be received (by the mobile device) over the wireless link (504). The received incoming transmission packets may be queued in a jitter buffer (506), from where the packets may be released (played out) at desired specified points in time for each packet. Improving performance without compromising quality may include identifying local radio events that affect a timing of incoming transmission packets to be received in the future via the wireless link (508), calculating a projected delay associated with the local radio events (510), and determining an effective delay used in releasing the queued incoming transmission packets from the jitter buffer according to the calculated projected delay (512).

Although the embodiments above have been described in considerable detail, numerous variations and modifications will become apparent to those skilled in the art once the above disclosure is fully appreciated. It is intended that the following claims be interpreted to embrace all such variations and modifications.

The invention claimed is:

1. A wireless user equipment (UE) device, the UE device comprising:
   a radio, comprising one or more antennas for performing wireless communication that includes receiving incoming transmission packets;
   a jitter buffer configured to queue the incoming transmission packets; and
   a processing element, coupled to the radio and the jitter buffer, and configured to:
      identify radio events that affect a timing of future transmission packets to be received in the future by the radio;
      estimate a specified number of emperical factors for each event type of the identified radio events;
      calculate a projected delay associated with the radio events according to at least the estimated specified number of empirical factors;
      compute a queue delay for all packets that have already been queued in the jitter buffer;
      determine an effective delay according to the queue delay and the projected delay; and
      control when the queued incoming transmission packets are released from the jitter buffer according to at least the effective delay.

2. The UE device of claim 1, wherein the radio events comprise at least one of:
   handover from one base station facilitating communication between the UE device and a second UE device, to another base station that is to take over facilitating the communication between the UE device and the second UE device;
   transfer of a communication in progress between the UE device and the second UE device on a first network associated with a first transmission technology, to a second network associated with a second transmission technology;
   signal strength measurements associated with signals carrying the incoming transmission packets received by the radio;
   measurements of packet error rates associated with the incoming transmission packets; or
   a count of a number of uplink retransmissions performed by the radio.

3. The UE device of claim 1, wherein the wireless communication comprises voice over long term evolution (VoLTE) communications.

4. The UE device of claim 1, wherein to estimate the specified number of empirical factors, the processing element is further configured to:
estimate two empirical factors for each respective radio event type of the radio events, and calculate the projected delay associated with each respective radio event type according to the two empirical factors estimated for that respective radio event type.

5. The UE device of claim 4, wherein the two empirical factors comprise:
a first empirical factor corresponding to an expected delay caused by the respective radio event type; and
a second empirical factor corresponding to a duration of the respective radio event.

6. The UE device of claim 4, wherein in calculating the projected delay, the processing element is configured to apply a weighting function to the second empirical factor.

7. A method for enhancing radio communications performance through radio level feedback, the method comprising:
receiving incoming transmission packets via a wireless communication medium;
queuing and holding the incoming transmission packets;
identifying radio events that affect a timing of future transmission packets to be received in the future;
estimating a specified number of empirical factors for each event type of the identified radio events;
calculating a projected delay associated with the radio events according to at least the estimated specified number of empirical factors;
determining an effective delay according to the projected delay; and
controlling when the queued incoming transmission packets are released, according to at least the effective delay.

8. The method of claim 7, wherein queuing and holding the incoming transmission packets comprises queuing and holding the incoming transmission packets in a buffer, and wherein controlling when the queued incoming transmission packets are released comprises releasing the queued incoming transmission packets held in the buffer according to the effective delay.

9. The method of claim 7, wherein the radio events comprise at least one of:
handover from one base station facilitating communication between a first user equipment (UE) and a second UE, to another base station that is to take over facilitating the communication between the first UE and the second UE;
transfer of a communication in progress between the first UE and the second UE on a first network associated with a first transmission technology, to a second network associated with a second transmission technology;
signal strength measurements associated with signals carrying the incoming transmission packets received by the radio;
measurements of packet error rates associated with the incoming transmission packets; or
a count of a number of uplink retransmissions performed by the radio.

10. The method of claim 7, wherein the wireless communication medium facilitates voice over long term evolution (VoLTE) communications.

11. The method of claim 7, wherein estimating the specified number of empirical factors comprises:
estimating two empirical factors for each respective radio event type of the radio events; and
calculating the projected delay associated with each respective radio event type according to the two empirical factors estimated for that respective radio event type.

12. The method of claim 11, wherein the two empirical factors comprise:
a first empirical factor corresponding to an expected delay caused by the respective radio event type; and
a second empirical factor corresponding to a duration of the respective radio event.

13. The method of claim 11, wherein calculating the projected delay comprises applying a weighting function to the second empirical factor.

14. A non-transitory memory element configured to store instructions executable by a processing element to cause a first mobile device to:
receive incoming transmission packets through wireless communication;
queue and hold the incoming transmission packets;
identify radio events that affect a timing of future transmission packets to be received in the future by the first mobile device;
estimate a specified number of empirical factors for each event type of the identified radio events; and
control when the queued incoming transmission packets are released responsive to at least the estimated specified number of empirical factors.

15. The non-transitory memory element of claim 14, wherein the instructions are further executable by the processing element to cause the first mobile device to:
calculate, based at least on the estimated specified number of empirical factors, a projected delay associated with the identified radio events; and
control when the queued incoming transmission packets are released according to the calculated projected delay.

16. The non-transitory memory element of claim 15, wherein the instructions are further executable by the processing element to cause the first mobile device to:
calculate an effective delay according to the projected delay and a previously computed delay determined for packets that have already been queued; and
control when the queued incoming transmission packets are released according to the calculated effective delay.

17. The non-transitory memory element of claim 14, wherein the radio events comprise transfer of a wireless communication in progress between the first mobile device and at least a second mobile device on a first wireless network associated with a first transmission technology to a second wireless network associated with a second transmission technology.

18. The non-transitory memory element of claim 14, wherein the radio events comprise at least one of:
signal strength measurements associated with signals carrying the incoming transmission packets;
measurements of packet error rates associated with the incoming transmission packets; or
a count of a number of uplink retransmissions performed by the first mobile device.

19. The non-transitory memory element of claim 14, wherein the instructions are further executable by the processing element to cause the first mobile device to:
identify radio events that affect a timing of future transmission packets to be received in the future by the first mobile device, to adapt to upcoming communications disruptions.

20. The non-transitory memory element of claim 14, wherein the instructions are further executable by the processing element to cause the first mobile device to:

send signaling corresponding to the radio events to a second mobile device, wherein the second signaling is usable by the second mobile device to:
calculate a projected delay associated with the radio events and relating to the second mobile device; and
determine an effective delay according to the projected delay, wherein the effective delay is usable by the second mobile device to control when transmission packets received and queued by the second mobile device are released according to at least the effective delay.

* * * * *